Feb. 19, 1935.  H. V. LUDWICK  1,992,078
SAFETY ATTACHMENT FOR WHEELS
Filed March 21, 1934  2 Sheets-Sheet 2
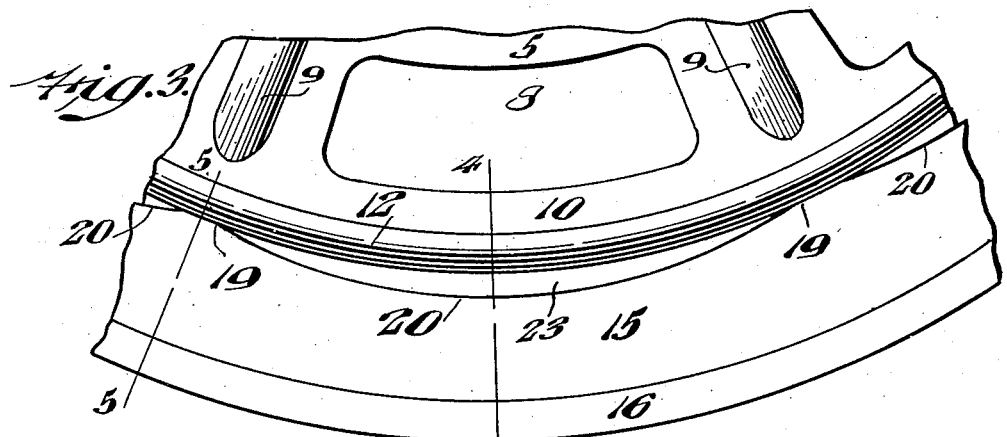
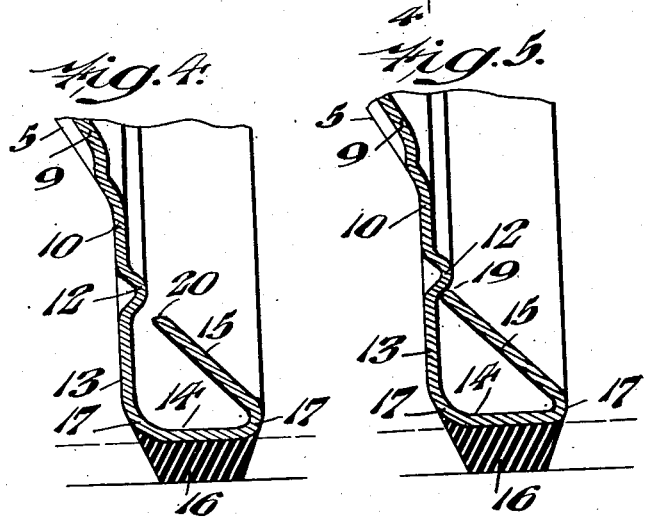
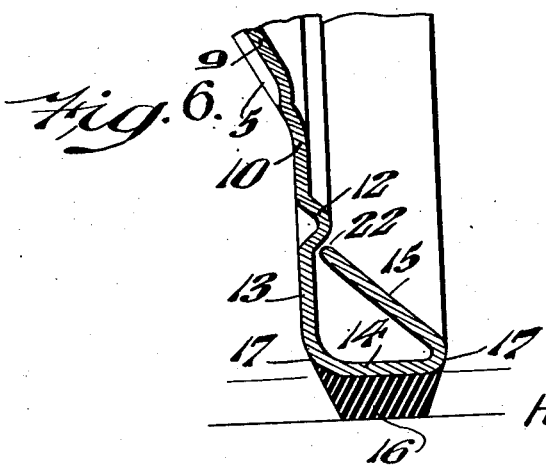
INVENTOR
HERBERT V. LUDWICK
BY Louis Necho
ATTORNEY Patented Feb. 19, 1935

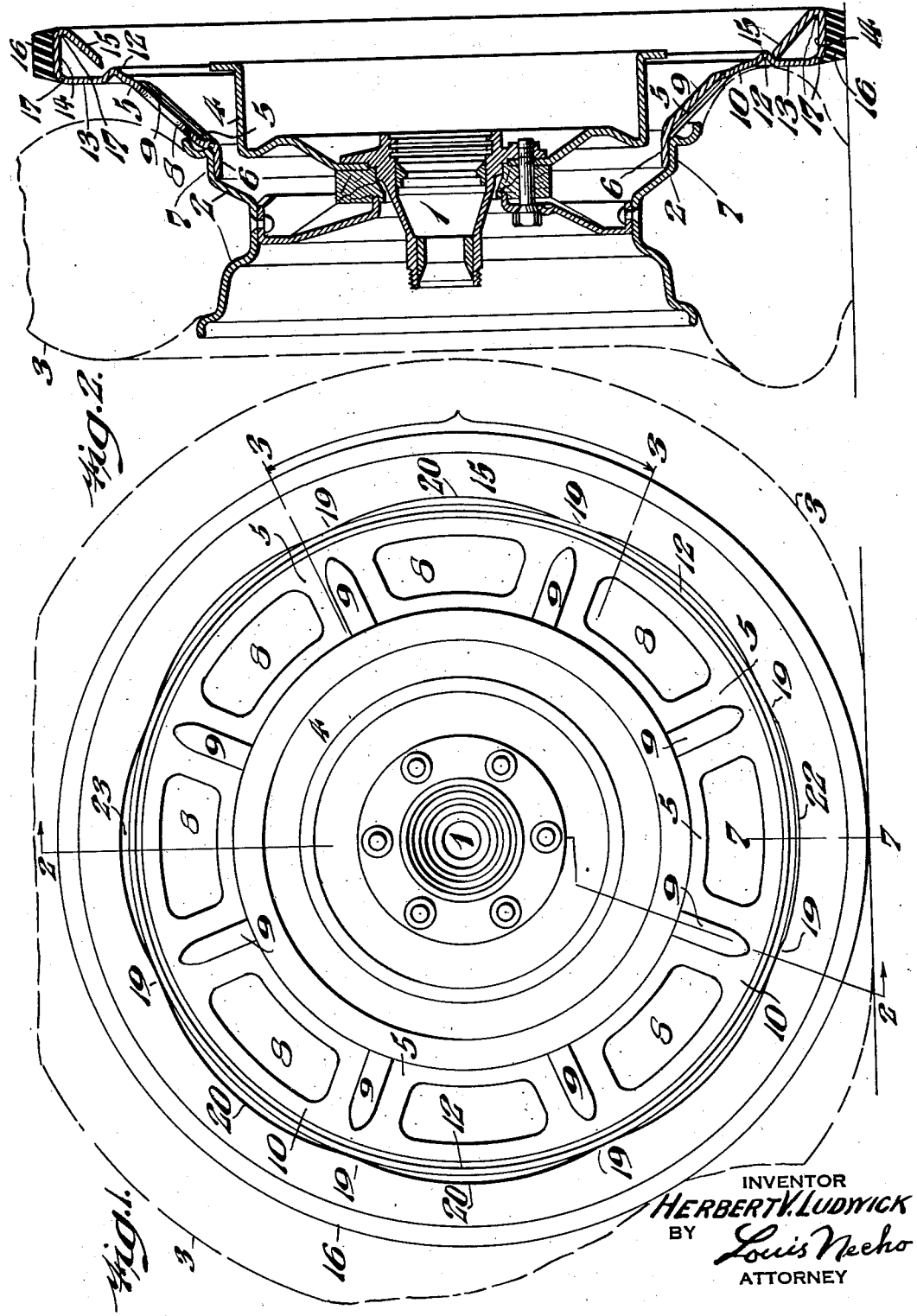

1,992,078

UNITED STATES PATENT OFFICE 1,992,078

SAFETY ATTACHMENT FOR WHEELS

Herbert V. Ludwick, Dearborn, Mich., assignor to American Tire Guard Company, Detroit, Mich., a corporation of Michigan Application March 21, 1934, Serial No. 716,589

4 Claims. (Cl. 301—39)

My invention relates to a new and useful safety attachment for wheels, and more particularly for wheels of automotive vehicles, whereby the danger of injury resulting from a blow-out or a sudden deflation of a pneumatic tire is greatly minimized or entirely eliminated and whereby the overheating of the tires on the wheels of vehicles with the resultant increase of danger of a blow-out and the attendant detrimental effect upon the pneumatic tires is prevented.

My invention still further relates to an attachment of this character, the construction of which combines a sufficient amount of resiliency to permit of adequate absorption of a normal load, and which is further capable of assuming the characteristics of a rigid, highly reinforced and self-locking member to withstand any excess load to which it may be subjected over and above the range of resilient absorption inherent in the structure.

My invention still further relates to an attachment of this character which embodies the advantages derived from the resiliency inherent in bridge construction, the resilient load absorbing member of my attachment being segmentally bridged along the circumference of the attachment to produce spaced alternating points of resiliency and rigidity, producing a continuous resilient effect when the wheel is in motion and nevertheless affording the necessary rigidity under conditions of excessive load.

My invention still further relates to an attachment of this character, which, due to the particular features of construction hereinabove stated and hereinafter more fully described, is capable of being manufactured from a relatively light gage steel at a relatively low cost of production.

My invention still further relates to an attachment of this character which is easily applicable to any form of conventional wheel construction, without any material or undue interference with or alteration of such wheel construction to render the device equally applicable to wheels already in use, as well as to wheels of future manufacture.

My invention still further relates to various other novel features of construction and advantage, all as disclosed and claimed in the following specification and the accompanying drawings, in which:

Fig. 1 is a side view of a wheel provided with a safety attachment embodying my invention, said wheel being shown with its pneumatic tire deflated.

Fig. 2 represents a section on line 2—2 of Fig. 1.

Fig. 3 represents, on an enlarged scale, a fragmentary view taken between the lines 3—3 of Fig. 1 illustrating more clearly the bridged structure or connection of the resilient member of the attachment forming my invention.

Fig. 4 represents a section on line 4—4 of Fig. 3.

Fig. 5 represents a section on line 5—5 of Fig. 3.

Fig. 6 represents a section on line 7—7 of Fig. 1.

Referring to the drawings in which like reference characters indicate like parts, 1 designates a hub of a wheel and 2 a drop center rim which is adapted to receive and support the pneumatic tire 3. 4 designates a conventional brake drum, the construction of the hub, rim, pneumatic tire and drum being of any desired conventional form, and since they form no part of the present invention they need not be described in further detail. My invention consists in the application of a dished disc or annular member which has the inwardly converging body portion 5, the inner, annular flat end 6 of which is welded or otherwise secured to the flat, annular portion 7 of the drop center rim 2 in the manner best illustrated in Fig. 2. In the body portion 5 of the dished disc or attachment mentioned are provided the holes 8 which are of any desired size or shape and which serve the double function of lightening the construction as well as ventilators to direct a current of air against the pneumatic tires 3 and against the brake drum 4 to prevent overheating of said tire and said brake drum. The body portion 5 of the attachment is also provided with the reinforcing ribs 9 which also may be of any desired length, cross section and allocation, in order to provide the maximum of strength consistent with minimum weight, it being understood that the entire attachment is preferably made of spring steel, in order to possess the desired strength and resiliency. The body portion 5 of the safety attachment merges into the rectilinear, annular portion 10 which is provided at a suitable point along the length thereof with the annular bead 12. The portion 10 extends beyond the bead 12 to constitute the vertical wall 13 which is bent outwardly to form the horizontal tread 14 which in turn is further deflected upon itself and towards the portion 13 and bead 12 to form the resilient and locking member 15. The tread 14 is preferably provided with the solid tire 16, and the junctions of the wall 13, the tread 14 and the resilient locking member 15 are rounded as at 17.

Referring to Fig. 1, it will be seen that the resilient locking member 15 is made to abut against the bead 12 at a plurality of points 19 throughout its circumference, the points of abutment of the member 15 against the bead 12 preferably coinciding with the position of the reinforcing ribs 9, of which in the present instance eight are employed. The inner edge 20 of the member 15 is eccentrically spaced from the circular periphery of the bead 12 between each pair of abutment points 19, the maximum spacing of the inner edge 20 of the member 15 with respect to the circular periphery of the bead 12 coinciding with the mid-point between the reinforcing ribs 9 and abutment points 19, as will be clearly seen from Figs. 1 and 3. The abutment points 19 are preferably of a relatively large and curved area to present substantial support, as best seen in Fig. 3.

Referring to Fig. 4, the curvature as well as the spacing of the edge 20 of the member 15 with respect to the bead 12 is more clearly illustrated while the contacting position of the parts referred to is also clearly shown in Fig. 5. Thus the length of each arcuate section of the member 15 intermediate any two contact points 19 is in the nature of a bridge-like construction and will possess a certain amount of resiliency, depending on the extent of the space intervening between the edge 20 and the bead 12, as well as upon the gage and index of elasticity of the steel employed. Thus, when the pneumatic tire 3 is deflated and the load of the vehicle is to be supported on the safety attachment described, the impact is against the rubber tire 16, which possesses a certain amount of cushioning effect, and the remainder of the load shock is absorbed by the movement of the eccentric arcuate sections 15 towards the circular edge of the bead 12. The attachment is constructed of a gage of steel having an index of resiliency such as will be capable of absorbing the normal load for which it is designed, so that when the attachment is subjected to load the edge 20 of the arcuate section of the member 15 between any two abutments 19 tends to move towards but does not completely contact with or abut against the bead 12, as shown at 22 in Figs. 1 and 7. As the wheel turns, the reinforcing rib and contact point 19 next in line of travel carry the load and the next arcuate section of the member 15 is brought to bear the load, and so on, so that the load is always successively, but, to all intents and purposes, continuously and simultaneously supported on the reinforced abutment point 19 and a resilient, movable, eccentrically spaced section of the member 15. As long as the attachment is not subjected to a load in excess of the maximum for which it is designed, including a margin of safety, the edges 20 of the member 15, when relieved of the load by the rotation of the wheel, reassume the open spaced position with respect to the bead 12, as best shown in Fig. 4. If the load is rather but not very excessive, the edge 20 of the member 15 will be forced into complete contact with or abutment against the bead 12, and in that event the bead 12 and the member 15 serve as complementary parts of a self-locking structure which presents a highly reinforced resistance to further torque or strain in the form of a solid triangle in cross section. Naturally when under load the tread 14 tends to assume a somewhat inclined position, as shown in dotted lines in Figs. 5 and 6, thus further and more completely interlocking the edge of the member 15 with the bead 12.

From the foregoing it will be seen that the arcuate sections of the auxiliary rim intermediate the welded points 19 act like a bridge which sags under the weight to which it is subjected but which resumes its normal or initial position after it is relieved of the weight thereby providing a continuous resiliency. In the present instance the arcuate segments yield by moving under the load upwardly towards the bead 12, as shown at 22 in Fig. 1, and resume their spaced position from the bead 12 when not subjected to the load, as shown at 23 in Figs. 1 and 4. The cut-outs 8 are made as large as possible consistent with maintaining the strength of the construction, in order to lighten the construction and in order to afford ventilated openings which will direct a current of air against the adjacent portion of the rim 2, thus tending to cool the latter while the body portion 5, as well as the reinforcing ribs 9 and the triangular cross sectional auxiliary rim, serve as radiating surfaces which conduct the heat from the rim 2 and dissipates it.

I claim:

1. A safety attachment for a vehicle wheel having a rim and a pneumatic tire adapted to be mounted on said rim, comprising an annular member secured at its inner periphery to said rim and having a bead formed in the body portion thereof, the portion of said body member beyond said bead being formed into a triangle in cross section, the outer leg of said triangle being resiliently segmentally movable under pressure with respect to the inner leg thereof and with respect to said bead, and the base of said triangle being adapted to serve as a resilient tread engaging the road surface when said pneumatic tire is deflated.

2. A safety attachment for a vehicle wheel having a rim and a tire mounted on said rim, comprising an annular body member secured at its inner periphery to said rim and having a bead formed therein, the radially outer portion of said body member beyond said bead being formed into a triangle in cross section, the radially inner edge of the outer leg of said triangle having points of permanent abutment against said bead at intervals along the length thereof, the sections of said radially inner edge intermediate such points of abutment being normally spaced from said bead and being movable under pressure towards said bead.

3. In an emergency wheel for application to vehicle wheels having pneumatic tires, an annular body having means whereby the same may be mounted at one side of a pneumatic tire and being formed between the inner and outer peripheral portions thereof with an annular strengthening bead having substantially flat converging meeting walls associated therewith, the portion of said body outward of said bead being formed with a tread portion having a return bend defining a leg at an acute angle to the radius of said annular body and having an inner edge portion engaging one of the walls of said bead at its junction with the annular body, said leg and the wall engaged thereby being approximately at right angles to each other, the said wall which engages the leg overlying the inner edge of the leg and extending to a point laterally beyond the same and being radially inward thereof in bracing relation thereto.

4. In an emergency wheel for application to vehicle wheels having pneumatic tires, an annular body having means whereby the same may be mounted at one side of a pneumatic tire and being formed between the inner and outer peripheral portions thereof with an annular strengthening bead having substantially flat converging meeting walls associated therewith, the portion of said body outward of said bead being formed with a tread portion having a return bend defining a leg at an acute angle to the radius of said annular body and having an inner edge portion engaging one of the walls of said bead at its junction with the annular body, said leg and the wall engaged thereby being at no greater angle than a right angle to each other, the said wall which engages the leg overlying the inner edge of the leg and extending to a point laterally beyond the same and being radially inward thereof in bracing relation thereto.

HERBERT V. LUDWICK.